Nov. 19, 1963  R. L. WHITMAN  3,111,030
EXTERIOR METER HOUSING
Filed Dec. 19, 1960
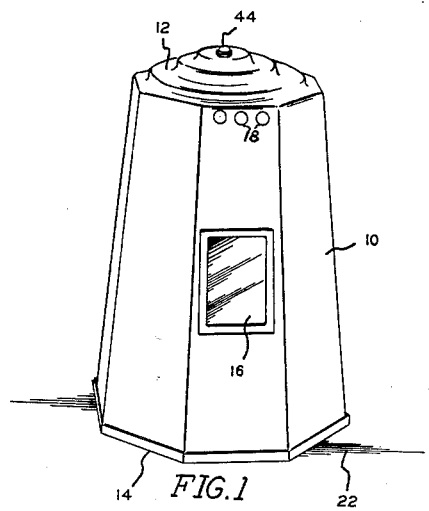
FIG.1
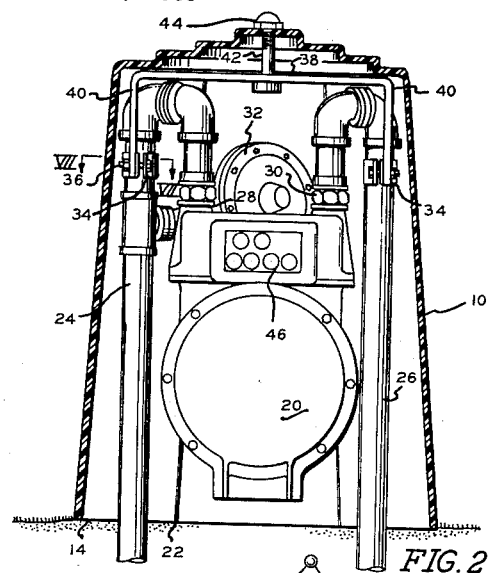
FIG.2
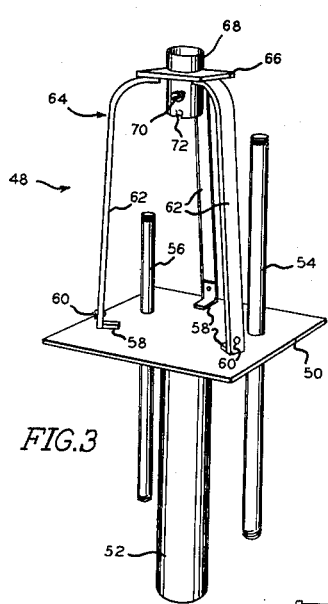
FIG.3
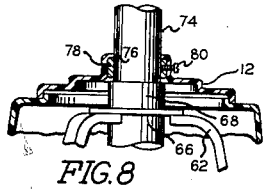
FIG.8
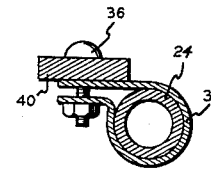
FIG.7
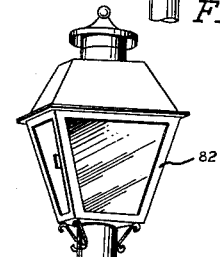
FIG.4
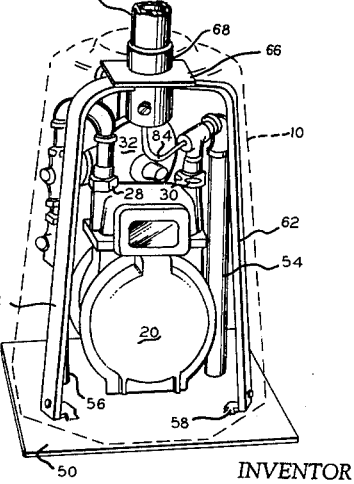
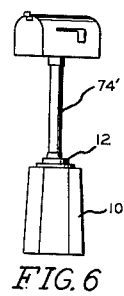
FIG.5  FIG.6
INVENTOR
ROBERT L. WHITMAN
BY Beaman & Beaman
ATTORNEY

United States Patent Office 3,111,030
Patented Nov. 19, 1963

3,111,030
EXTERIOR METER HOUSING
Robert L. Whitman, Jackson, Mich., assignor to Handley Industries, Inc., Jackson, Mich., a corporation of Michigan
Filed Dec. 19, 1960, Ser. No. 76,951
5 Claims. (Cl. 73—201)

The invention pertains to an exterior utility meter housing and particularly relates to a housing which is of attractive appearance and may, if desired, be employed in conjunction with house or yard accessories.

There are several important advantages in locating gas or water meters exteriorly and separate from the building receiving the utility service. Such advantages include safety, ease of installation, accessibility and quick reading of the meter without the necessity of entering the building. Utility meters have not been extensively mounted in exterior housings in Northern climates in that the temperature differential to which the meter is subjected during the year often renders the meter inaccurate, however, the newer meter designs usually include a temperature differential compensator and, hence, the exterior mounting of utility meters has recently become more practical.

In that the exterior mounted meter is normally located intermediate the street main and the dwelling, in the service line, the meter will normally be located somewhere on the front lawn of a domestic dwelling and, hence, the appearance of an exterior meter housing becomes important due to its prominent location upon the property. To this end, the applicant provides an exterior housing for utility meters which is mounted slightly above ground level, which is of attractive appearance and, in one embodiment, the meter housing forms a pedestal on which attractive lawn or yard accessories may be mounted.

It is therefore an object of the invention to provide an exterior meter housing which is attractive in appearance, is strong and durable and requires a minimum of maintenance and which permits rapid reading of the meter therein.

A further object of the invention is to provide an exterior meter housing wherein the structure maintaining the meter in position includes the piping employed with the meter therein.

A further object of the invention is to provide an exterior meter housing wherein a base element is employed including conduits to which the meter may be affixed and support structure is incorporated with the base wherein the base may be accurately positioned during the installation of the base and housing.

Yet a further object of the invention is to provide an exterior meter housing structure wherein the meter is encompassed within a framework and lawn accessory apparatus may be mounted upon the framework.

These and other objects of the invention arising from the details and relationships of an embodiment thereof will become apparent from the following description and accompanying drawings wherein:

FIG. 1 is an elevational perspective view of a meter housing in accord with the invention, FIG. 2 is an elevational sectional view of the embodiment of FIG. 1, shown in a slightly larger scale, FIG. 3 is an elevational perspective view of the base weldment which may be employed with the housing of the invention, FIG. 4 is a perspective elevational view of a gas meter as employed with the weldment of FIG. 3, showing the housing in phantom lines and a gas lamp mounted upon the weldment framework, FIGS. 5 and 6 are elevational views of different lawn accessories which may be employed with the meter housing in accord with the invention, FIG. 7 is a plan enlarged sectional view of the housing mounting bracket structure employed in FIG. 2, and FIG. 8 is an elevational sectional view of the top of the housing as employed with the weldment sleeve and accessory post structure.

The exterior appearance of a meter housing constructed in accord with the invention is best shown in FIG. 1, where the housing 10 may consist of a molded hollow form, having an upper cover portion 12 and a lower edge 14. In the illustrated form, the housing is of an eight-sided configuration when the sides slightly converge in an upward direction to define a pedestal-like configuration. A transparent window 16 is formed in one side of the housing of glass, Plexiglas, or the like and vent holes 18 are formed on opposite sides of the housing near the upper regions thereof to provide cross ventilation. The cover portion 12 is preferably provided with a hole of appropriate diameter concentric to the axis of the houisng to receive either a threaded stud or the accessory post for maintaining the housing in position upon the meter structure as will be later explained.

It will be appreciated that the meter housing may take many different forms than that shown and it is preferred that the meter be molded of a lightweight, relative inert synthetic material such as a rubber-resin compound (A.B.S. polymer) such as a blend of copolymers styrene-acrylonitrile resin and butadiene-acrylonitrile rubber, such as is commercially available under the trade names Kralastic or Cycolac. One advantage of forming the housing in a slightly tapered configuration lies in the fact that such configuration permits nesting of the housings for shipping purposes.

For use with a gas meter, the arrangement for a water meter being somewhat similar, the simplest installation and form of the housing is shown in FIGS. 1 and 2. The meter 20 would normally be mounted above the ground level 22 by means of the high pressure vertically extending conduit 24 and the low pressure vertically extending conduit 26 which transports the service to the dwelling. In that gas meters normally are provided with inlet and outlet ports 28 and 30, respectively, on top of the meter, suitable fittings are provided for extending the high pressure and low pressure in a downward direction for attachment to the meter and a pressure regulator 32 is included in the high pressure line to provide the proper service pressure. The housing 10 may be affixed to the meter and conduit structure by the use of a pair of clamps 34, FIG. 7, having a portion which circumscribes the vertical conduits 24 and 26 and a bolt 36 extends therethrough for tightening the clamp upon the associated conduit. A U-bracket 38 having legs 40 extends over the piping and is provided with a hole adjacent the end of each leg 40 whereby the bolt 36 of each clamp may extend through the leg hole and therein tightening of the clamps 34 upon the pipes also affixes the U-bracket 38 to the piping, as shown in FIG. 2. The bracket 38 is provided with a threaded stud 42 extending in an upward direction as to extend through a hole in the cover portion of the housing 10 and a nut 44 threaded upon the stud will maintain the housing in position upon the bracket, meter and piping arrangement. By the vertical adjustment of the clamps 34 upon the associated conduits the stud may be located such that the lower edge of the housing rests upon the ground and the housing is installed such that the window 16 permits reading of the recording dials 46 of the meter 20. It will be appreciated that many different types and forms of the bracket and clamp structure may be employed to mount the housing upon the meter structure and the described bracket and claimed embodiment is only one arrangement which is suitable.

If it is desired to employ the meter housing as a pedestal for a lawn accessory, such as an electric lamp, gas lamp, house address marker, mail box, etc., the weldment of FIG. 3 is employed in conjunction with the housing 10. The weldment 48 consists of a plate 50, preferably of steel, having a tubular anchor post 52 welded to the underside thereof and extending perpendicular to the plane of the plate. A high pressure pipe or conduit 54 extends through a hole in the plate 50 and is welded thereto. A low pressure conduit 56 also extends through a hole in the plate and is welded to the plate in parallel relation to the post 52 and the conduit 54. The conduits 54 and 56 are provided with threads at each end, permitting the necessary piping to be affixed to each end of the conduit. Preferably, the anchor post 52 has a 4½″ O.D. whereby the anchor post may be wedged into the 4″ trench in which utility service piping is normally laid. The service piping which is buried would be first attached to the lower ends of the conduits 54 and 56 and then the anchor post 52 pushed into the trench until the plate 50 rests upon the ground surface.

Three L-shaped brackets 58 are welded to the upper side of the plate 50 and each bracket is provided with a hole in the upwardly extending portion to receive a bolt 60 which permits the leg portions 62 of a bracket framework 64 to be affixed to the brackets 58. The legs 62 are preferably of channel cross-section and are formed inwardly at their upper ends whereby a plate 66 may be welded thereto in parallel relation to the plate 50. A tubular sleeve 68 is affixed to and extends through the plate 66, in a vertical direction, and is provided with a set screw 70 which is threaded into a hole extending through the wall of the sleeve. Preferably, the lower edge of the sleeve 68 is provided with one or several portions 72 which are radially deflected inwardly to act as an abutment to prevent a post inserted into the sleeve from passing therethrough, as will be later apparent.

The space between the bracket legs 62 is sufficient to straddle a meter and regulator, as shown in FIG. 4 and a tubular post 74 may be inserted into the sleeve 68 until it rests upon the inwardly deflected portions 72 and upon tightening the set screw 70 the post 74 is accurately fixed within the sleeve. A hole 76, FIG. 8, of sufficient dimension to permit the insertion of the post 74 therethrough, is formed in the cover portion 12 of the housing and a ring 78 of metal or synthetic material is bonded to the inside of the housing cover 12 in concentric relation to the opening 76 containing a set screw 80 extending through the cover portion whereby the housing may be maintained in position by tightening the set screw 80. It will be noted that the lower edge 14 of the housing rests upon the upper surface of the plate 50.

In FIG. 4 a gas lamp 82 is illustrated as being mounted upon the upper end of the post 74 and a conduit 84 extending up through the post provides gas to the lamp mantle.

FIG. 5 discloses a post 74′ mounted upon the weldment of the housing in accord with the invention, on which a house address number is mounted and FIG. 6 discloses a mailbox mounted upon the bracket mounted post 74′. If it is desired to service the meter, unloosening of the set screw 80 permits the housing to be moved vertically up along the post 74 and retightening the set screw will hold the housing in a vertical position which permits the meter and the structure normally encased within the housing to be serviced.

It will be understood that various modifications to the invention may be apparent to those skilled in the art without departing from the spirit and scope thereof and it is intended that the invention be defined only by the following claims.

I claim:

1. A housing structure for an exteriorly mounted meter supported above and adjacent ground level comprising, in combination, a horizontally disposed base plate adapted to rest upon the ground level, a vertical support member affixed to the underside of said base plate extending therebelow, vertically extending inlet and outlet conduits affixed to said base plate and extending therethrough, bracket means affixed to the upperside of said base plate extending vertically above said conduits, a housing encompassing said bracket means and conduits, and fastening means securing said housing relative to said bracket means.

2. In a housing structure as in claim 1 wherein said housing is formed of a lightweight, nonmetallic, relatively inert, opaque material and a transparent window is defined in said housing.

3. In a housing structure as in claim 1 wherein said bracket means comprises a plurality of substantially vertically extending elements affixed to said base plate at lower ends at spaced locations and common means including a collar affixed to the upper ends of said elements.

4. In a housing structure as in claim 3 wherein said collar includes a post receiving socket, a cover portion defined upon said housing, an opening defined within cover portion in alignment with said socket and a post within said socket extending vertically from said housing.

5. In a housing structure as in claim 1, wherein said bracket means includes a vertically disposed post-receiving socket, and said housing having an opening defined therein in alignment with said socket.

References Cited in the file of this patent
UNITED STATES PATENTS
2,690,077    Lisenbee _____ Sept. 28, 1954